United States Patent [19]
Cho

[11] 3,827,808
[45] Aug. 6, 1974

[54] METHOD AND APPARATUS FOR MEASURING THE OPACITY OF SHEET MATERIAL IN WHICH THE TRANSMITTANCE SIGNAL IS COMPENSATED FOR THE REFLECTIVITY OF THE MATERIAL

[75] Inventor: Boong Y. Cho, Columbus, Ohio
[73] Assignee: Industrial Nucleonics Corporation, Columbus, Ohio
[22] Filed: May 9, 1973
[21] Appl. No.: 358,606

[52] U.S. Cl............... 356/199, 250/228, 250/571, 356/201, 356/236
[51] Int. Cl.. G01n 21/18, G01n 21/22, G01n 21/30
[58] Field of Search .......... 356/199, 200, 204, 205, 356/206, 236, 73, 201; 250/228, 571, 572

[56] References Cited
UNITED STATES PATENTS
3,455,637  7/1969  Howard ........................... 356/204

Primary Examiner—Vincent P. McGraw

[57] ABSTRACT

Specifically disclosed is a method and apparatus for measuring the opacity of sheet material, more particularly for measuring the opacity of paper according to the TAPPI contrast ratio definition. A moving sheet of paper from a paper making machine or coater is passed through the gap between a light source and a photodetector. The light transmitted through the paper is passed through a window of opal glass and a bandpass filter before it is received by the photodetector. The opal glass window constitutes a partial reflector having an effective reflectivity between about 20 and 70 percent. This produces multiple reflections between the opal glass and the paper next to it, with sufficient magnitude to compensate the transmittance measurement for the reflectivity of the paper, and thereby automatically corrects the instrument for changes in the composition of the paper. Because of the bandpass filter, the photodetector responds substantially only to light in the visible portion of the spectrum. According to another disclosed arrangement wherein the opal glass window is not used, the instrument is compensated by the use of a second photodetector responsive to light reflected from the side of the paper where the light source is located. Signals from the two detectors are then combined in a simple computer arrangement to obtain a signal which is compensated for the reflectivity of the paper. The compensated signal provided by either of the disclosed arrangements is correlated with opacity in conformance with the TAPPI standard.

31 Claims, 12 Drawing Figures

PATENTED AUG 6 1974 3,827,808

METHOD AND APPARATUS FOR MEASURING THE OPACITY OF SHEET MATERIAL IN WHICH THE TRANSMITTANCE SIGNAL IS COMPENSATED FOR THE REFLECTIVITY OF THE MATERIAL

This invention relates to a method and apparatus for measuring the opacity of a moving sheet of material, and more particularly it relates to detecting the transmission of light through the sheet and compensating the detected response for the reflectivity of the material, thereby to provide an opacity measurement which is substantially independent of changes in the composition of the material.

The reflectivity of paper is defined as the relative amount of light reflected from a large number of sheets stacked together. The reflectivity of the paper is closely related to its brightness.

In the manufacture and/or coating of paper, it is important to be able to measure, and thereby to control, the degree to which printing on the reverse side of a sheet or on successive sheets is visible through the first sheet. This depends on both the thickness of the paper and reflectivity of the paper which is affected by its composition.

The general, classic definition of opacity as the reciprocal of the transmittance is not well correlated with ordinary human observations of hiding power, and so the Technical Association of the Pulp and Paper Industry (TAPPI) has adopted a special definition of opacity as the contrast ratio $R_0/R_{0.89}$. Here $R_0$ is the reflectance of a sheet of paper over a black surface and $R_{0.89}$ is its reflectance when placed over a reference white backing body of glass-covered magnesium carbonate.

The industry has adopted for a standard measuring instrument an opacimeter manufactured by the Bausch and Lomb Optical Company, as basically described in U.S. Pat. No. 1,950,975, which is calibrated with standard samples available from the Bureau of Standards. While this instrument provides excellent results in the laboratory, paper manufacturers have a need for an on-line measuring instrument capable of measuring the output of paper making machines or coaters continuously, as the material is being produced. With such an instrument, either manual or automatic control could be applied to the process in real time, thereby saving valuable raw materials and increasing the quality of the paper.

Accordingly, attempts have been made to simulate the laboratory tests for opacity on a continuous and automatic basis, for example, by an instrument as described in the Howard and Howard et al. U.S. Pat. Nos. 3,455,637 and 3,476,482. An account of the field testing of this instrument appears in an article by Van Brimer and Howard entitled, "A Noncontact Contrast-Ratio Opacimeter for On-Machine Measurements", appearing in TAPPI, Volume 50, No. 2, February, 1967, pp. 65A–70A. While this instrument is reported to have performed well for short time periods, it does not appear that it has proved to be a practical instrument for use in a mill environment, because of its non-linearities, great complexity and the resulting inability of mill personnel to keep the instrument adequately clean and in proper calibration.

Another approach to the on-line measurement of opacity is described in an article by Gaylen Springer entitled "A Light Transmission Type On-Line Opacity Meter," appearing in TAPPI, Volume 54, No. 3, March, 1971, pp. 411–412. This apparatus simply measures the transmittance of the paper, using a light source on one side of the paper and a photodetector on the other. Because of its simplicity, such an apparatus has possibilities for providing a reliable and reproducible measurement in an industrial environment. Unfortunately, however, visual opacity is not a unique function of the transmittance. According to the TAPPI definition, the opacity is given by $$op = R_0/R_{0.89} \qquad 1$$

that is, the ratio of two reflectances, where $R_0$ is the reflectance of the paper with a black backing (a plate with a reflectivity of less than 0.005) and $R_{0.89}$ is the reflectance of the paper when backed with a backing plate having a reflectivity $R_g$ of 0.89 (the magnesium carbonate backing). According to the Kubelka-Munk theory, the reflectance of paper is given by $$R = R_0 + (R_g T_0^2 / 1 - R_0 R_g) \qquad 2$$

where $T_0$ is the transmittance of paper with a black backing. Hence, the TAPPI opacity becomes $$op = \frac{1}{1 + \frac{0.89 T_0^2}{(1 - 0.89 R_0) R_0}} \qquad (3)$$

This equation shows that the opacity is not a unique function of the transmittance, and explains why an opacity gauge which relies entirely on a simple transmittance measurement suffers from a composition error due to the dependence of opacity on the reflectivity of the paper. For this reason, such opacity gauges have had to have their readings corrected by an empirically determined factor which has to be determined for each grade of paper to account for differences in the paper composition with reference to some nominal or arbitrary standard composition. If the paper composition as manifested by the reflectivity remained constant throughout the production of a grade of paper, it might be possible to compensate the simple transmittance gauge electrically, using a grade switch arrangement. Unfortunately, however, there are in many cases substantial variations within a particular grade of paper. These variations may occur unpredictably while a given run of paper is in progress, due to variations in the furnish supplied to the machine, and accordingly substantial errors in the opacity measurement may occur and persist.

In accordance with the present invention, there is provided an improved method and apparatus for gauging opacity, using basically the transmittance gauge, but wherein the basic transmittance signal is compensated for the reflectivity of the paper. According to one preferred procedure and apparatus for carrying out the invention, the basic transmittance gauge, comprising a light source on one side of the sheet and a photodetector on the opposite side, is modified so that a partial reflector having an effective reflectance between about 20 per cent and about 70 per cent is interposed between the material and the photodetector. Insofar as the basic transmittance measurement is concerned, the reflector simply attenuates the transmitted radiation beam, thus initially lowering the ouptut of the photodetector by a fixed percentage. However, light which is reflected by the partially reflecting window is directed onto the detector side of the sheet and may be again reflected from the sheet, perhaps with multiple reflections. Particularly in the case of a sheet having a high reflectivity, much of this re-reflected light eventually impinges on the detector, modifying, or more specifically, augmenting, the basic detector response to the transmitted radiation per se. For a given transmittance of paper, a sheet with a high reflectivity is less opaque than a sheet with a lower reflectivity, and hence the degree of modification of the detector output signal is in accordance with the reflectivity. In the case of a sheet made of a highly absorptive substance, and hence having a low reflectivity, the light reflected onto the sheet from the partially reflecting window is largely simply absorbed by the sheet without being re-reflected and detected by the detector. Hence the degree of modification of the signal is less with the sheet of lower reflectivity.

According to another procedure and apparatus embodying the present invention, but wherein the reflective window is not used, in addition to the transmitted light detector on the opposite side of the sheet from the incident light source, a second detector is located on the same side of the sheet as the light source. This second detector detects light from the incident beam which is initially reflected from the sheet. The signal from the second detector is used to modify, or specifically, to augment, the signal from the first detector, thereby also compensating the transmittance signal response for the reflectivity of the sheet. In either case, the modified response of the transmitted light detector is correlated with the opacity of the sheet, thereby providing an output signal which is indicative of opacity and substantially independent of variations in the reflective characteristics of the sheet such as may be caused by composition changes in the furnish from which the sheet is made.

The objects of the present invention are to provide a method and apparatus for rendering a continuous, on-line opacity measurement which is substantially completely correlated with contrast ratio determinations at all points along the length of a moving sheet, to provide an opacity gauge which is not only accurate but simple and highly reliable for continuous operation in a rigorous industrial environment, to provide such an instrument which is not subject to any substantial error as a result of composition changes or other changes in the sheet which affect is reflectivity, to provide a method and means to compensate for difference in surface reflectivity or surface finish, and to provide a method and means for accentuating opacity gauge sensitivity in certain opacity ranges when the reflectance of the paper can be expected to remain substantially constant.

Other objects and advantages of the present invention will become apparent in the following detailed description of a few preferred procedures and embodiments of the present invention, taken in conjunction with the appended drawings, in which:

Figure 1:
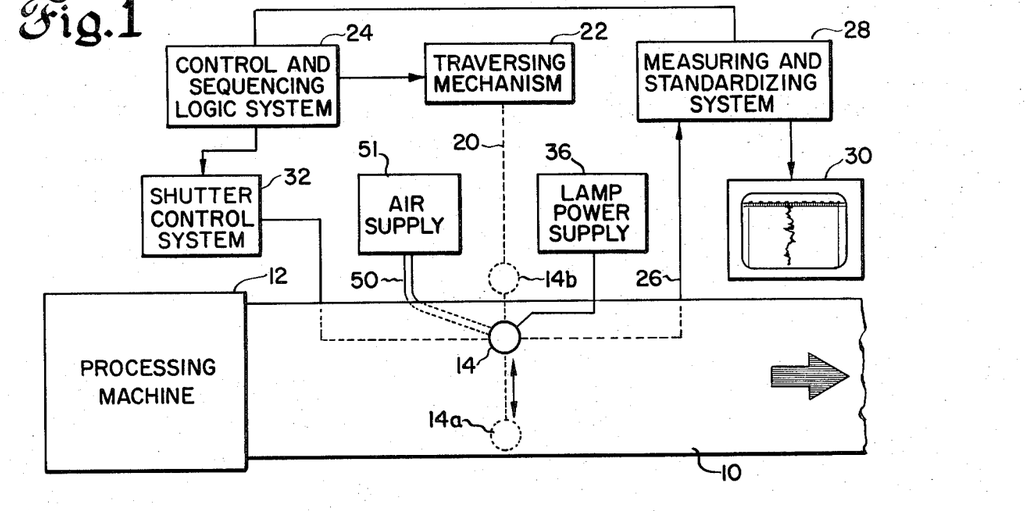
FIG. 1 is a schematic showing of a processing machine such as a paper making machine in combination with an opacity gauging system according to the present invention.
Figure 2:
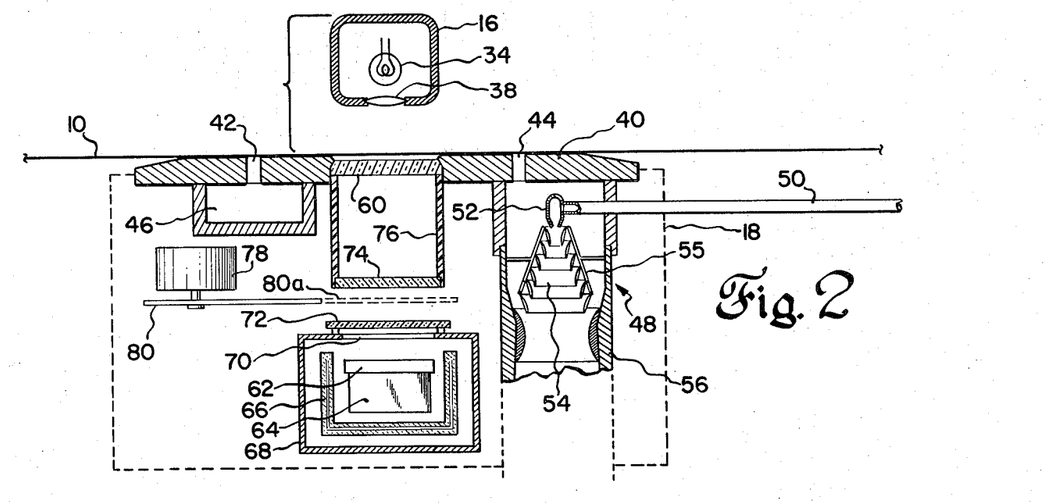
FIG. 2 is a quasi-sectional schematic view of the opacity gauging head 14 of FIG. 1.

Referring now to FIG. 1, thre is shown a sheet of material 10 such as paper issuing from a processing machine 12 such as a paper making machine and/or coater. In order to measure the opacity of sheet 10 according to the invention the sheet is passed continuously through a gauging head 14. Gauging head 14 comprises a lamp housing 16 (FIG. 2) mounted above the plane of the sheet 10 and a detector housing below the sheet. In FIG. 2, the detector housing is shown schematically by the dashed line enclosure 18.

The opacity gauging head is incorporated in a conventional gauging system arrangement such as that disclosed in U.S. Pat. No. 3,668,401, issued June 6, 1972 to Franklin B. Shah et al. The lamp and detector housings are mounted on a traversing structure indicated by the dashed lines 20 and connected to a conventional traversing mechanism 22 whereby the opacity gauge head can be moved back and forth across the width of the sheet, say, to position 14a indicated by the dotted circle. The gauging head can also be moved to an off-sheet position shown by the dotted circle 14b for purposes of standardizing the instrument. The traversing mechanism is controlled by a conventional control and sequencing logic system 24.

The gauging head 14 provides a signal on line 26 which is utilized by a measuring and standardizing system 28. The output of the measuring and standardizing system is connected to an opacity recorder 30. The measuring and standardizing system 28 as well as the gauge traversing mechanism 22 is under the control of the control and sequencing logic system 24. Logic system 24 also operates a shutter control system 32 for opening and closing a shutter 80 in gauging head 14. Except for gauging head 14, the above described gauging system is substantially identical with the system described in U.S. Pat. No. 3,668,401, except for minor modifications specifically noted hereinafter.

Referring to FIG. 2, the lamp housing 16 encloses a small 12-volt lamp 34 which is connected to a regulated lamp power supply 36 (FIG. 1). The lamp housing is painted a dull black on the inside to minimize reflections. The light emitted directly from lamp 34 is directed onto the paper sheet 10 by a lens arrangement represented by convex lens 38. The lens forms a light beam of generally parallel rays where the light passes through the sheet 10 so as to minimize the effect of vertical deflection, that is, changes in the spacing between the light source and the detector.

The sheet passes over a polished stainless steel plate 40 which extends above the detector housing 18. If appropriate, plate 40 may be covered with an antifriction surface of a material such as a hard Teflon resin compound. The sheet 10 is normally held in light sliding contact with plate 40 due to suction which is applied through a ring of holes as at 42 and 44. These holes open into an annular, eccentrically tapered manifold 46.

The interior of manifold 46 is kept below atmospheric pressure by a vacuum pump 48 which is preferably of the type more completely disclosed in a copending application Ser. No. 286,075, filed Sept. 5, 1972, by Allen D. Alexander. This pump creates the vacuum in manifold 46 by blowing a small volume per unit time of air from supply 51, FIG. 1 at relatively high positive gauge pressue through a pipe 50 and a nozzle 52 directed downwardly through a series of progressively larger Venturi-like conical shells as at 54 supported by a spider 55 inside a standpipe 56 opening through the bottom of the detector housing 18. By this means the small stream of relatively high positive-pressure air is transformed into a high-volume, low-pressure flow of air which is vented to the atmosphere through the bottom of standpipe 56, thus producing a negative gauge pressure in manifold 46.

The suction applied to the bottom of the paper sheet 10 functions not only to normally keep the traveling sheet in light frictional engagement with plate 40 so as to minimize flutter, but also acts like a vacuum cleaner to remove dust and loose debris carried along the underside of the sheet, thereby preventing accumulation of this material on the detector window 60. The top surface of this window is recessed below the surface of plate 40 a distance of about 15 mils to prevent the sheet 10 from rubbing directly on the window and thereby producing deposits, discoloration or changes in the optical characteristics of the window which can otherwise occur if the window is mounted flush with the top surface of plate 40.

In the preferred apparatus embodying the present invention, the window 60 constitutes the partial reflector hereinabove mentioned. In a typical gauge the window is made of opal glass having a reflectivity of about 0.5. The opal glass is mounted with its translucent, milky surface on the bottom, inside the detector housing and away from the paper 10.

The sensing element is a silicon photovoltaic cell 62, which, together with its electrical connector strips 64, is mounted inside a heated, temperature-controlled oven arrangement 66. The photocell and oven assembly are mounted inside of a photocell housing 68 having an aperture 70 covered by a gasketed, thin glass window 72.

A bandpass filter 74 is mounted between the photocell 62 and the light source 34 and window 60 to adjust the spectral response characteristic of the photocell so that it is sensitive substantially only to light in the visible range. This is appropriate since "hiding power" and TAPPI opacity are related to visual characteristics. Filter 74 is mounted in the end of an elongated plastic tube 76 whose other end abuts the reflective window 60. The length of tube 76 and the air space therewithin serves to thermally insulate the photocell 62 from the sheet 10 and the external environment. This is in addition to conventional insulation (not shown) which surrounds the photocell housing 68. Tube 76 is preferably lined with gold foil for reflecting wide-angle radiation onto the photodetector.

Also enclosed in the detector housing 18 is a rotary solenoid 78 which carries on its actuator shaft a black, opaque shutter 80. When energized by the shutter control system 32 (FIG. 1), solenoid 78 swings shutter 80 into a closed position shown by the dashed line representation 80a. In this closed position the shutter prevents substantially all light from reaching the pbotodetector 62. As noted hereinabove, the measuring and standardizing system 28 is essentially that described in U.S. Pat. No. 3,668,401, and that system incorporates the MOSFET electrometer circuit of U.S. Pat. No. 3,654,468. The above two patents specifically disclose a gauge using a nuclear source of penetrating radiation such as beta radiation and employ an ionization chamber as a detector. In the case of the ionization chamber, the detector load resistor has a resistance on the order of $10^{11}$ ohms, whereas for the silicon photovoltaic detector herein considered the detector load resistor has a resistance of 100K ohms. In the case of the ionization chamber detector, when the circuit is zeroed as described in U.S. Pat. No. 3,668,401 the electrometer input is disconnected from the ionization chamber and the chamber instead is connected to ground. The shutter over the nuclear radiation source is closed merely out of radiation safety considerations. In the modification of the circuit according to the present invention using the photodetector, the photodetector remains connected to the electrometer input during zero standardization. Since the shutter of the present FIG. 2 is closed during zero standardization also, the circuit is zeroed with the photodetector still connected to the electrometer, and the zero standardizing operation thereby eliminates the effect of the dark current of the photodetector.

Figure 3:
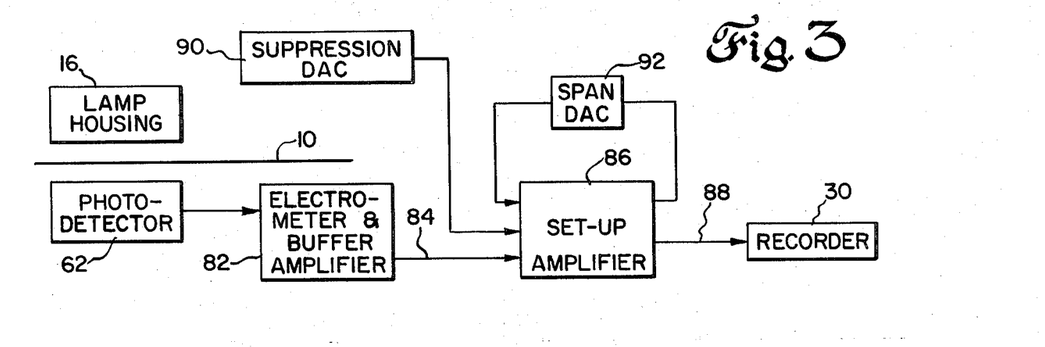
FIG. 3 is a block diagram illustrating the manner in which a preferred apparatus is arranged for correlating the detector output signal with the visual opacity.

A block diagram of an opacity measuring system according to the invention is shown in FIG. 3. The output of photodetector 62 is applied to an electrometer and buffer amplifier 82 which supplies a standardized output voltage on line 84 to a setup amplifier 86. The setup amplifier in turn supplies a calibrated voltage via line 88 to recorder 30.

The voltage on line 88 supplied to recorder 30 is correlated with the visual contract ratio opacity, specifically the TAPPI opacity, of the paper sheet 10 by providing appropriate calibration settings to a suppression digital-to-analog converter (DAC) 90 and a span DAC 92. The instrument may be calibrated by placing the gauging head 14 in the off sheet position 14b (FIG. 1), inserting in the gauge samples of the paper whose opacity has been or will be determined by the laboratory standard opacimeter, and using settings of the suppression and span DACs 90 and 92 to correlate the readings on the recorder with the opacity values as determined in the laboratory.

This is a standard correlation technique for calibrating such gauges and is well known to those skilled in the art. As a general comment, the suppression DAC 90 supplies to set-up amplifier 86 a voltage in opposition to the buffer amplifier output 84 so as to null a particular value of the output voltage and thus cause recorder 30 to read out a particular value for a particular opacity value. That is to say, a calibration curve relating opacity to voltage output 88 can be shifted vertically in order to cause a predetermined opacity value to be indicated at a predetermined point, say, at the left end or the center of the recorder scale (FIG. 1). The setting of the span DAC 92 controls the gain of setup amplifier 86 and thereby controls the slope of the curve relating opacity values to voltage output 88 so that a predetermined change in the recorder reading results from a given change in opacity value.

Figure 4:
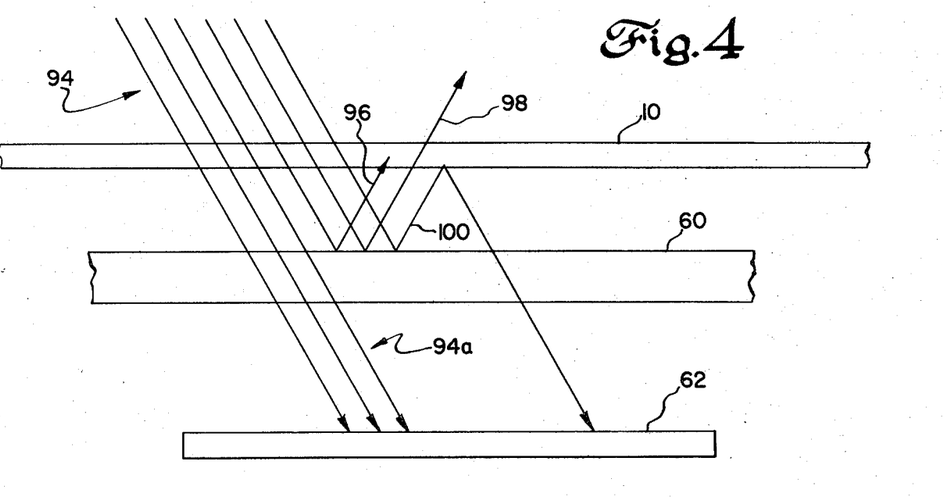
FIG. 4 is a sketch illustrating the principles of a preferred embodiment of the invention comprising the partial reflector arrangement.

With the foregoing description of the preferred embodiment of the invention in mind, it is appropriate to consider further the theoretical background of the invention and the criteria for selecting the partial reflector 60. FIG. 4 provides a much simplified explanation of the principle involved in the apparatus of FIG. 2. Here again the paper 10, the partially reflecting window 60 and the photodetector 62 are indicated by the same reference numerals. There is represented a beam of light 94 which passes through the paper sheet 10. The window 60 has a reflectivity of 0.5, and accordingly half of the beam 94a is indicated to have passed through the window 60 whereas the other half of the beam has been reflected thereby. The portion 94a of the beam which passes through the partial reflector window 60 impinges on photodetector 62 and thereby elicits from the detector a response indicative of the intensity of the light transmitted through the paper 10. The other half of the beam which is reflected from window 60 of course is unavailable for this purpose.

Considering the light from beam 94 which is reflected from the partial reflector 60, there is shown one ray 96 which is absorbed in the paper 10. Another ray 98 passes again entirely through the sheet 10. A third ray 100 is reflected from the underside of paper 10 and travels back through the window 60 to impinge on the detector 62. This augments the basic transmittance signal generated in response to rays 94a, and thereby compensates the signal for the reflectivity of the paper 10.

It is apparent that if the paper had a higher reflectivity there would be greater probability that one of the rays 96 and 98 would also be reflected from the paper, thereby to further augment the detector response.

To gain some appreciation of the manner in which compensation occurs, consider two pieces of paper, both of which have the same opacity but one piece of paper has a higher reflectivity than the other. Assume that the less reflective paper is measured first, obtaining a signal proportional to the intensity of rays 94a falling on the detector 62. If now the more reflective paper is placed in the gauge, part of the incident radiation beam 94 will be reflected initially from the top surface of paper 10, and accordingly there will be less transmitted radiation 94a to impinge on the detector, thus resulting in a lower detector output signal. However, due to the action of the partially reflective window 60, the higher reflectivity of the sheet will result in the collection of a relatively greater number of rays such as ray 100 reflected from the underside of the sheet, and accordingly the output of detector 62 will tend to remain more nearly constant. It is to be understood, of course, that half of the rays reflected from the underside of sheet 10 will be rereflected from the window 60, and multiple reflections will therefore occur to a large extent. This tends to make the partial reflector even more effective to compensate for reflectivity. These phenomena are much more complex than this simplified explanation would indicate.

Referring again to equation 3 hereinabove, the transmittance $T_0$ is the transmittance with a black backing. If the paper is backed with a plate of reflectivity $R_d$, it can be shown that $T_0 = (1-R_0R_d)T$. Accordingly, the TAPPI opacity equation can be written as $$op = \frac{1}{1+\frac{0.89(1-R_0R_d)^2T^2}{R_0(1-0.89R_0)}} \quad (4)$$

Equation 4 shows that the TAPPI opacity is not simply a function of the transmittance per se because of the factor $$F = (1-R_0R_d)^2/[R_0(1-0.89R_0)] \quad 5$$

Figure 5:
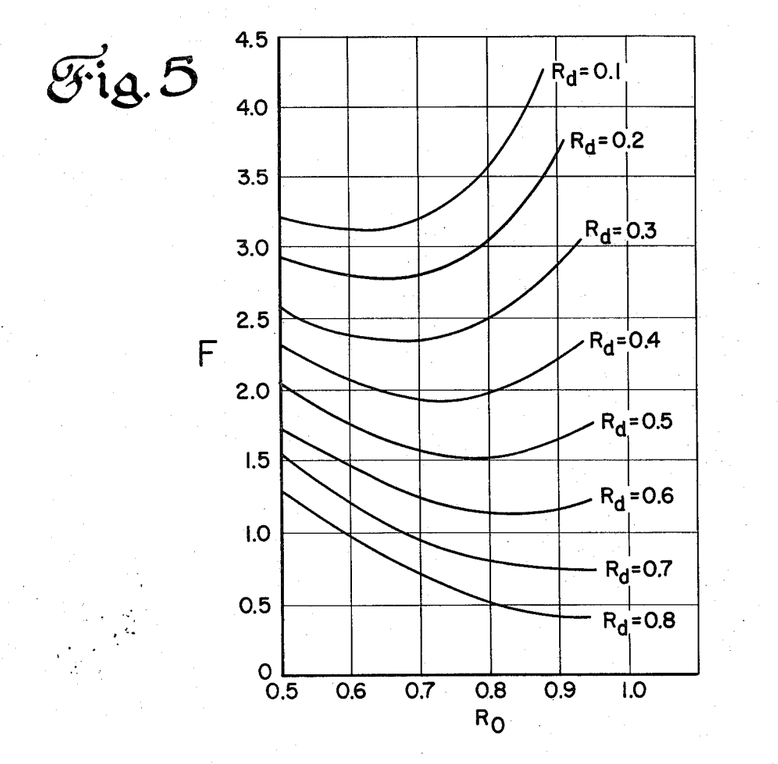
FIG. 5 is a graph showing variations in a composition factor F as a function of the reflectance $R_0$ for partially reflective windows having different reflectivity values $R_d$.

FIG. 5 shows a plot of the factor F, which may be termed a composition factor, as a function of $R_0$, the reflectance of paper with a black backing, for several values of $R_d$. This figure shows that by selecting a suitable value for $R_d$ it is possible to make the point of zero slope on the F-function correspond with a particular value of $R_0$ in the range of $R_0$ values between 0.6 and 0.9 or greater. Thereby, it is possible for $R_0$ to vary above and below the particular value over a considerable range without producing a substantial change in the value of F. So long as F remains substantially constant, whatever value it assumes is immaterial since this is accounted for in the calibration of the instrument.

Figure 6:
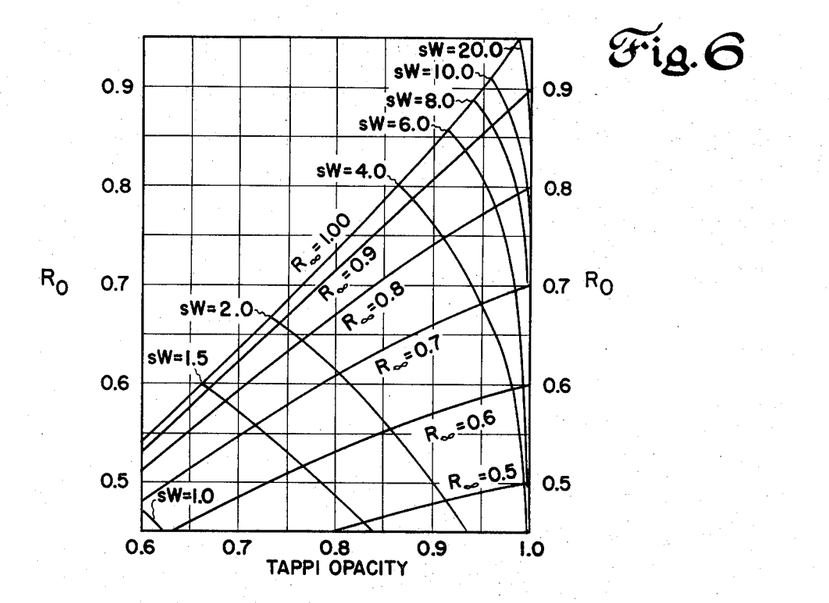
FIG. 6 is a skeletonized version of a known opacity chart which is useful for illustrating the theory and practice of the present invention.

FIG. 6 is a skeletonized version of a well-known reflectance-opacity chart which is constructed from the Kubelka-Munk formula. For further information concerning the derivation of this chart, reference can be made to Dean B. Judd, *Color in Business, Science, and Industry*, John Wiley and Son, Inc., 1952, FIG. 100, p. 319. In FIG. 6, the lines coursing upward to the right are lines of constant reflectivity $R_-$. $R_-$ is determined by measuring the reflectance of a sheet over an opaque pad of similar sheets rather than over a black plate or a magnesium carbonate plate. The lines coursing upward to the left are lines of constant scattering power $sW$ where $s$ is the scattering coefficient and $W$ is the basis weight of the paper.

Normally, there is no practical need for an on-line opacity gauge to measure papers with reflectivity values outside the range of about 0.75 to 0.95. Hence, for each value of TAPPI opacity which needs to be measured, there is only a certain limited range of $R_0$ values in which the gauge needs to operate properly. These values can be determined from the chart outlined in FIG. 6. For example, at an opacity of 0.95 and a reflectivity $R_-$ of 0.75 the corresponding reflectance $R_0$ is about 0.73. At the same opacity and a reflectivity of 0.95, the corresponding reflectance $R_0$ is about 0.88. Similar ranges of $R_0$ for other opacity values are shown in column (2) of Table 1.

TABLE 1

| (1) Opacity | (2) Range of $R_o$ | (3) Approximate Optimum $R_d$ for Constant F Value | (4) Optimum $R_d$ for Unique Opacity | (5) Measured Opacity Range for $R_d$=0.5 |
|---|---|---|---|---|
| 0.95 | 0.73–0.88 | 0.7 | 0.6 | 94.8–95.2 |
| 0.90 | 0.70–0.83 | 0.65 | 0.5 | 89.9–90.1 |
| 0.85 | 0.67–0.78 | 0.6 | 0.4 | 84.7–85.3 |
| 0.80 | 0.64–0.73 | 0.4 | 0.3 | |
| 0.75 | 0.60–0.68 | 0.3 | 0.2 | |

Column (3) of Table 1 lists the approximate optimum values of $R_d$ to cause the F-function to have zero slope at the stated opacity value in column (1). Hence, if the window 60, FIG. 2, has a reflectivity of 0.7, a sheet of paper 10 with an opacity of 0.95 can be measured with substantially zero error. Because the slope of the composition factor F is zero at 0.95 opacity, opacity values which deviate by reasonably small amounts above and below 0.95 opacity can be measured within very small tolerances for error.

In the design of a practical instrument, however, consideration is given also to the fact that at higher opacity values, the opacity is more highly sensitive to the transmittance T. Hence, a much larger deviation in the composition factor F can be tolerated when the gauge is measuring paper with high opacity. From actual opacity computations obtained through a computer analysis of the gauging parameters, the optimum $R_d$ values shown in column (4) are obtained. These values are somewhat lower than the values shown in column (3). It is to be noted, however, that these values are quite substantial by comparison with ordinary window materials. Ordinary window glass, for example, has a reflectivity of only about 0.05.

In most paper manufacturing or coating processes where opacity measurements are desired, the opacity generally ranges in value from 85 to 95 "points". The opacity in points is obtained by multiplying the opacity values as shown in column (1) by 100. The reflectivity $R_\infty$ of the paper produced by these processes may range from 0.75 to 0.95, as above noted. Accordingly, for the great majority of opacity gauging applications the partially reflective window of the preferred embodiment of the invention shown in FIG. 2 can have a fixed reflectivity value of about 0.5. Column (5) of Table 1 shows the change in the measured opacity, in points, for each of three opacity target values, due to a change in paper reflectivity from 0.75 to 0.95. The maximum composition shift is only ± 0.3 points. It is unlikely that the paper produced by any given machine will include grades having reflectivities which differ over such a wide range, and hence as a practical matter the maximum composition error actually encountered will only be on the order of about 0.1 points.

For the exceptional case where extremely wide variations in reflectivity and/or opacity are encountered, arrangements can be made to change $R_d$ to suit the requirements of the material. One arrangement for this purpose is depicted in FIG. 7.

Figure 7:
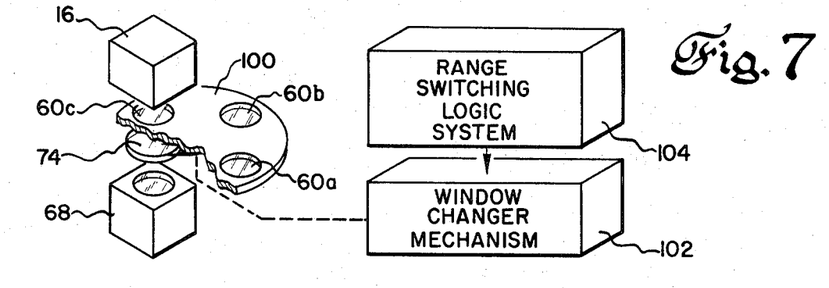
FIG. 7 is a schematic showing in perspective of a modification of apparatus according to the invention.

In the system of FIG. 7, a turret wheel 100 is used to mount a plurality of partially reflective windows 60a, 60b and 60c. These partially reflective windows, having different reflectances, are brought selectively into position between lamp housing 16 and photocell housing 68 by means of a suitable window changer mechanism 102. Such turret and automatic changer mechanisms are well known in the radiation gauging art. For example, a suitable automatic turret and changer mechanism is disclosed in Westinghouse Descriptive Bulletin No. 404–100, describing an X-ray thickness gauge, dated September, 1950. Where such a window selector mechanism is needed, the window changer mechanism 102 is desirably controlled by a range switching logic system 104 which controls the suppression and span DAC units 90 and 92 as described in the Shah et al. U.S. Pat. No. 3,668,401 referenced hereinabove.

Figure 8:
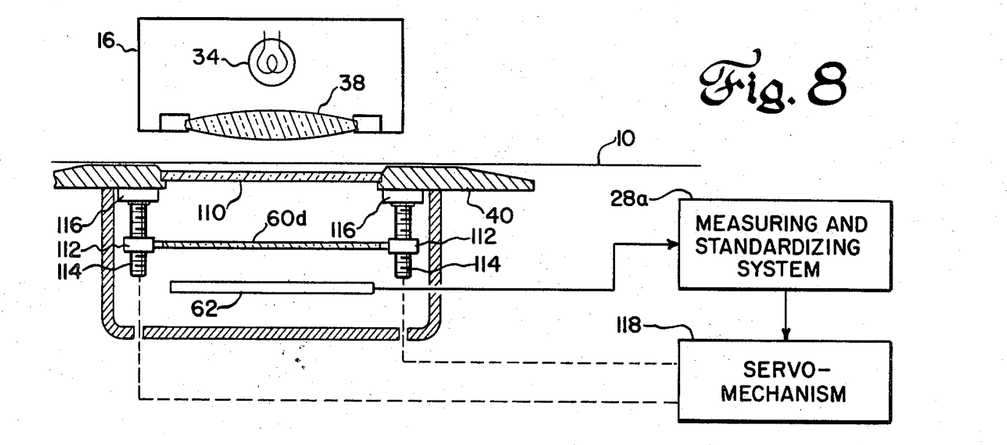
FIG. 8 is a schematic showing of another modification of apparatus according to the invention.

Referring to FIG. 8, it is also possible to effectively provide a continuously variable $R_d$ value. As shown in this figure the partially reflective window 60 is replaced by a plain glass window 110 over which the sheet 10 passes for measurement. A partially reflecting window 60d is then mounted below the plain glass window. The reflective window 60d is mounted in a carrier 112 which is threaded for adjustment up and down on elevator screws as at 114. The elevator screws rotate in suitable bearings as at 116 which suspend these screws from the plate 40 which supports the sheet 10.

Typically, the partial reflector 60d should have a reflectivity of 0.6 or possibly higher. When the translucent plate 60d is close to the window 110, the reflectance of the detector head is close to that of the window plate 60d. As the distance is made larger and larger by turning the screws 114 to lower the translucent plate, the effective reflectance of the detector head gradually decreases.

The adjustment of elevator screws 114 can be done manually where infrequent changes are necessary. However, since the movable translucent plate provides an infinitely variable effective reflectivity $R_d$, the adjustments can be made automatically by a servomechanism 118 which responds to the opacity value output signal provided by the measuring and standardizing system 28a.

Figure 9:
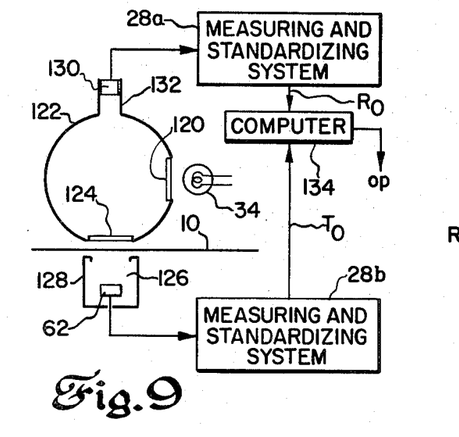
FIG. 9 is a schematic showing of an apparatus utilizing a second detector to compensate the transmission measurements for changes in the reflectivity of the material.

FIG. 9 shows an arrangement for measuring contrast ratio opacity without the use of a partial reflector on the detector side of the sheet 10. Here the light source 34 shines through a light input window 120 of an integrating sphere 122 which provides a very uniform illumination of a portion of sheet 10 through a light exit window 124. The transmitted light detector 62 is mounted in a black cavity 126 within a housing 128. A reflected light detector 130 is mounted in a light passage comprising a bottleneck extension 132 of the integrating sphere, so that detector 130 views the illuminated portion of sheet 10 opposite the black cavity through window 124.

The output of detector 130 is connected to a conventional measuring and standardizing system 28a which provides an output indicative of the reflectance $R_0$. Likewise, the output of detector 62 is connected to a measuring and standardizing system 28b which provides as an output a signal indicative of the transmittance $T_0$. The $R_0$ and $T_0$ outputs are received by a computer 134, which computes and outputs a signal indicative of the opacity op, substantially independent of the reflectivity of the paper sheet 10.

Figure 10:
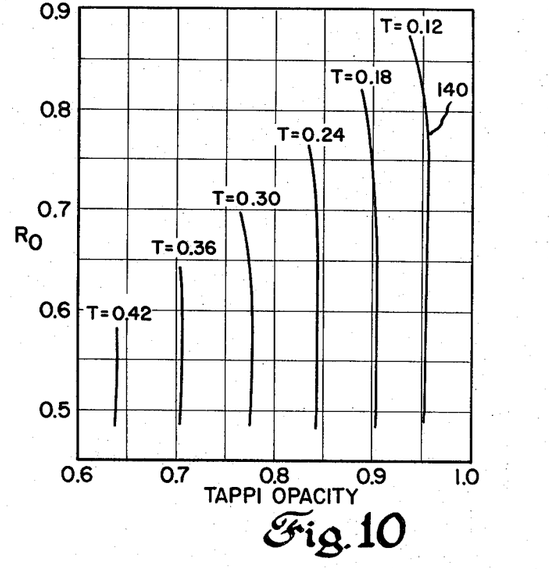
FIG. 10 is another showing of the opacity chart of FIG. 6 with portions omitted and having superimposed thereon a series of equitransmittance lines.

The rationale of computer 134 is best explained by reference to the graph of FIG. 10. FIG. 10 is essentially the opacity chart of FIG. 6, omitting parts which are not essential to the instant discussion. Superimposed on the opacity chart are a series of equitransmittance lines, which are the heavy lines running generally vertically up the chart and bending slightly to the left at the top.

The points on the right hand equitransmittance curve 140, for example, are obtained by assuming a constant value of $T_0 = 0.12$ and computing the opacity from equation (3) for a number of appropriate values of $R_0$. The other equitransmittance curves are plotted from points similarly calculated using the assumed constant values for $T_0$ of 0.18, 0.24, 0.30, 0.36 and 0.42.

It is apparent that where the heavy equitransmittance lines are parallel to the light, straight, vertical equiopacity lines (where the TAPPI opacity values are 0.95, 0.90, 0.85, etc.) there is no need to compensate the simple transmittance detector 62 of FIG. 9 for reflectivity changes. However, as is shown by the bending of the equitransmittance line 140 at high reflectivity values, although the transmittance remains constant the opacity decreases as $R_0$ increases, and accordingly the opacity signal indicative of the constant transmittance detector 62 output needs to be incremented so as to indicate the opacity decrease. Obviously, as a gross phenomenon the transmittance signal output of detector 62 must increase as the opacity decreases. Hence, the required correction to the transmittance signal simulates an increase in the output of detector 62 as the reflectivity increases with a constant transmittance. This is the effect which is achieved by the use of the partial reflector 60 of FIG. 2, for example.

Figure 11:
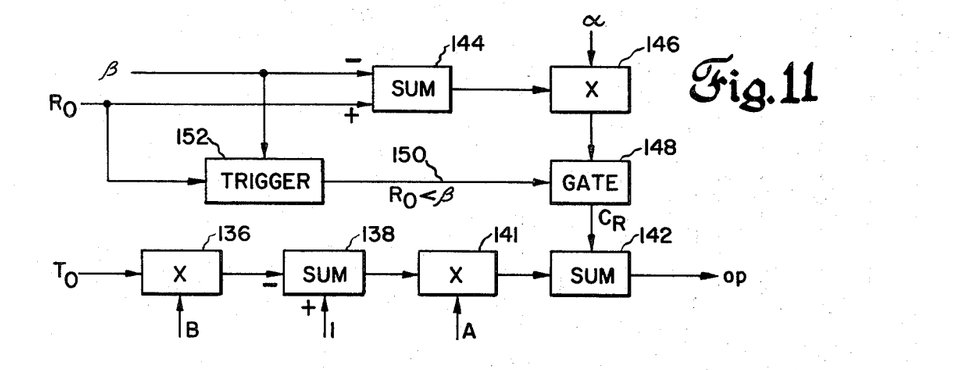
FIG. 11 is a block diagram of one form of the computer 134 of FIG. 9.

A computer for adding a simple linear correction term to the opacity value obtainable directly from the transmittance $T_0$ is shown in FIG. 11. Grossly, the opacity is derived from the transmittance by the relation $op = A(1 - BT_0)$ where A and B are calibration constants, and this relation holds in those regions of FIG. 10 where the equitransmittance lines are parallel to the equiopacity lines. Accordingly, the transmittance signal $T_0$ from measuring and standardizing system 28b is fed into a multiplier 136 wherein it is multiplied by the constant B which is fed in via a manually adjustable signal input. The product $BT_0$ signal output of multiplier 136 is fed to a summing device 138 and therein subtracted from a constant representing unity provided by another manually adjusted input. The output of summing device 138 is fed to a multiplier 141 and therein multiplied by calibration constant A which is supplied from a further manual input. The output of multiplier 141 is applied to a summing device 142 whereby a suitable reflectivity correction term $C_R$ can be added in order to provide at the output of summing device 142 an opacity signal which is corrected for the reflectivity of the paper.

Referring again to FIG. 10, in the regions where opacity measurements are ordinarily needed the equitransmittance lines as at 140 are reasonably parallel to the equiopacity lines at low values of $R_0$, but begin to deviate at some value $\beta$. Generally, for ordinary opacity measurements $\beta$ can be taken as 0.6 since no significant amount of compensation is necessary for lower values of $R_0$.

Accordingly, for $R_0$ values less than $\beta$, the compensation term $C_R$ is zero. At higher $R_0$ values, the correction term added is computed in accordance with $C_R = \alpha(R_0 - \beta)$. To this end, there is provided a summing device 144 which receives a signal indicative of $R_0$ from measuring and standardizing system 28a and also receives a manually adjusted input value indicative of $\beta$. As previously noted, a typical value for $\beta$ is 0.6. In the summing device 144, $\beta$ is subtracted from $R_0$ and the difference is fed to a multiplier 146 where this difference signal is multiplied by the calibration constant $\alpha$ which is provided through a suitable manual input. The output of multiplier 146 represents $C_R$, and is applied to a gate 148. Gate 148 transmits the $C_R$ signal to summing device 142 unless a disabling signal is received at the other gate input 150. The gating signal input 150 comes from the output of a trigger circuit 152. The trigger circuit compares the amplitudes of $\beta$ and $R_0$ and switches to provide the disabling output 150 to gate 148 when $R_0$ becomes less than $\beta$.

In summary, the computer of FIG. 11 is perhaps the simplest version of an analog computer 134 for use in the system of FIG. 9. This computer computes the opacity in accordance with $$op = A(1 - BT_0) + C_R \qquad (6)$$

$$\text{where } C_R = \begin{cases} \alpha(R_0 - \beta) & \text{if } R_0 > \beta \\ 0 & \text{if } R_0 > \beta \end{cases}$$

Figure 12:
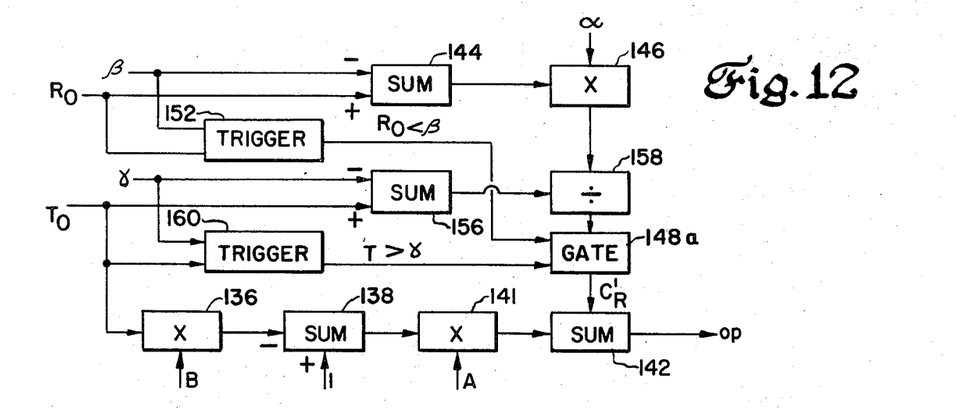
FIG. 12 is a block diagram of a more complex analog computer suitable for use in the system of FIG. 9.

A somewhat more versatile and more accurate opacity gauging arrangement in accordance with FIG. 9 results from the use of a slightly more complex computer arrangement as shown in FIG. 12. This computer computes the opacity in accordance with $$op = A(1 - BT_0) - C'_R \qquad (7)$$

$$\text{where } C_R' = \begin{cases} \dfrac{\alpha(R_0-\beta)}{(T_0-\gamma)} & \text{if } R_0 > \beta \\ & \text{and } T_0 < \gamma \\ 0 & \text{if } R_0 < \beta \\ & \text{or } T_0 > \gamma \end{cases}$$

The computer of FIG. 12 incorporates computer elements 136, 138, 141, 142, 144, 146 and 152, which perform the same functions as in FIG. 11. Additionally, however, the transmittance signal $T_0$ and a calibration constant $\gamma$ are summed by a summing device 156 which effectively subtracts the constant $\gamma$ from the value of $T_0$. The output of multiplier 146, again representing the quantity $\alpha(R_0 - \beta)$ is divided in a divider 158 by the output of summing device 156 representing the quantity $T_0 - 65$. The output of divider 158 is fed through a modified gate 148a to summing device 142. The gate 148a is similar to gate 148 of FIG. 11, but is modified to accept a second disabling input from a second trigger circuit 160. Trigger circuit 160 monitors the amplitude of the transmittance signal $T_0$ and provides a disabling output to gate 148a whenever $T_0$ exceeds $\gamma$. Accordingly, the reflectivity correction term $C'_R$ which is summed with the first order opacity signal in summer 142 is zero whenever $R_0$ is less than $\beta$ or if the transmittance $T_0$ is greater than $\gamma$.

While the invention has been described and illustrated in connection with specific procedures and specific apparatus, it is apparent that many modifications of the disclosed procedures and apparatus can be made without departing from the scope of the invention as is set forth in the appended claims. For example, the preferred apparatus of FIGS. 2, 7 and 8 utilizes partially reflective windows 60 to 60d in a range of reflectances between about 0.2 and 0.7, it is obvious from FIG. 8 that windows having actually higher reflectivities than about 0.7 can be either fixedly or adjustably recessed below the aperture window 110 to thereby provide effective reflectivities within the range aforesaid.

It is of course possible to produce a partial reflector by designing an array of transparent and totally reflective elements. One such arrangement would simply involve drilling holes in a mirror until only one-half or so of its surface area remained. The perforated mirror would then be used, for example, to replace the opal glass partial reflector 60d of FIG. 8, so that about half of the light transmitted through or reflected from sheet 10 would pass through the holes and impinge on detector 62. Such an arrangement would probably be less satisfactory, however, than the opal glass, particularly with respect to standardization, when the gauge is withdrawn from the sheet. With the opal glass, the light from the lamp is still diffused over the detector as it is when the paper is in the gap during measurement, whereas with the perforated mirror arrangement, at least portions of the detector would view the light source directly. This might tend to make the standardizing signal subject to change due to slight positional displacements of the lamp and detector housings, and the detector output during standardization would be excessively larger than it would during measurement.

While the computer 134 of FIG. 9 has been illustrated in FIGS. 11 and 12 as a simple analog computer, it is apparent that the general purpose process control digital computers which are commonly employed in combination with basis weight and moisture gauges in paper manufacturing plans can be programmed to compute opacity values from the $R_O$ and $T_O$ measurements, or even from the raw output of detectors 62 and 130. Obviously, with the use of digital computers the correction terms herein illustrated can be replaced by more complicated functions such as parabolic correction functions, or computations using table look-up schemes may be employed as well. Thus, the opacity measurements can be obtained with substantially greater accuracy where necessary.

As has been discussed in an article by Van Den Akker entitled "The Meaning and Measurement of Opacity" appearing in TAPPI, May, 1967, Volume 50, pages 41a to 43a, it has been proposed to revise the present contrast ratio definition of opacity to use a contrast ratio based on the paper reflectivity $R_\_$ rather than the arbitrary $R_{0.89}$. If this is done, the partial reflector arrangement of FIGS. 2, 7 and 8 may become less satisfactory, so that the arrangement of FIG. 9 with the digital computer may become the preferred arrangement.

What is claimed is:

1. The method of measuring the visual opacity of a moving sheet of paper or the like, which comprises
   directing a beam of visible light through the sheet from one side thereof,
   detecting said beam on the other side of the sheet to produce a response indicative of the intensity of the light transmitted through the sheet,
   modifying said response according to the reflectivity of said sheet by additionally detecting a substantial amount of light which has been reflected from said sheet, and
   correlating said modified response with the visual opacity of said sheet to provide an opacity measurement which is substantially independent of variations in the composition of said sheet.

2. The method of claim 1 wherein said response modifying step comprises
   reflecting a substantial portion of the light transmitted through said sheet back toward said sheet so that it can be rereflected by the sheet, and
   additionally detecting at least a portion of said rereflected light.

3. The method of claim 1 wherein said response modifying step comprises
   detecting on said one side of the sheet a portion of the light from said directed beam which is reflected from the sheet.

4. The method of measuring the visual opacity of a sheet of paper or the like, which comprises
   passing the sheet between a light source and a visible light detector so as to derive from the detector a response indicative of the intensity of the light transmitted through the sheet,
   augmenting said response according to the reflectivity of the sheet by additionally detecting a substantial amount of light which has been reflected from said sheet, and
   correlating said augmented response with the visual opacity of said sheet to provide an opacity measurement which is substantially independent of variations in the reflectivity of said sheet.

5. The method of claim 4 which comprises
   reflecting a substantial portion of said light transmitted through the sheet back toward said sheet, and wherein said light reflected from said sheet is detected on the side of said sheet opposite said light source.

6. The method of claim 4 wherein said light reflected from said sheet is detected on the same side of said sheet as said light source.

7. The method of measuring the visual contrast ratio opacity of a sheet of paper or the like, which comprises passing the sheet between a light source and a detector,
   filtering at least the portion of the light from said source which is transmitted through the sheet and incident on said detector,
   producing a response in accordance with said filtered light incident on said detector which is indicative of the intensity of the visible light transmitted through the sheet,
   modifying said response according to the reflectivity of said sheet by additionally detecting a substantial amount of visible light which has been reflected from said sheet, and
   correlating said modified response with the visual contrast ratio of said sheet to provide an opacity measurement which is substantially independent of variations in the reflectivity of said sheet.

8. The method of claim 7 which comprises
   reflecting a substantial portion of said light transmitted through the sheet back toward said sheet, and wherein said light reflected from said sheet is detected on the side of said sheet opposite said light source.

9. The method of claim 7 wherein said light reflected from said sheet is detected on the same side of said sheet as said light source.

10. The method of measuring the visual contrast ratio opacity of a moving sheet of paper or the like, which comprises
directing a beam of visible light through said sheet from one side thereof,
reflecting a substantial portion of the light in said beam which is transmitted through said sheet back toward said sheet whereby said reflected light can be rereflected from said sheet,
detecting both said transmitted and said rereflected light,
producing a response in accordance with said detected light, and
correlating said response with the contrast ratio $R_0/R_g$ where $R_0$ is the reflectance of said paper as measured over a black backing and $R_g$ is the reflectance of said paper as measured over a white backing.

11. The method of claim 10 wherein said response is correlated with the contrast ratio $R_0/R_{0.89}$ where $R_{0.89}$ is the
reflectance of the paper as measured over a magnesium carbonate backing.

12. The method of claim 10 which includes filtering at least the portion of said transmitted and rereflected light which is detected so that said response simulates the response of the human eye.

13. The method of claim 10 wherein said substantial portion of the transmitted light reflected back toward said sheet is between 20 and 70 percent of at least that portion of the transmitted light which effectively contributes to said response.

14. Apparatus for measuring the visual opacity of a moving sheet of paper or the like, which comprises
a visible light source,
a visible light detector,
means for supporting said light source and said detector on opposite sides of said sheet,
means coupled to said detector for deriving a response indicative of the intensity of the visible light transmitted through said sheet and detected by the detector,
means for substantially modifying said response in accordance with the intensity of visible light reflected from said sheet, and
means for correlating said modified response with the visual opacity of said sheet.

15. Apparatus as in claim 14 wherein said response modifying means comprises
means for reflecting back toward said sheet a substantial portion of the visible light transmitted through the sheet so that said transmitted and reflected light can be rereflected by said sheet and detected by said detector.

16. Apparatus as in claim 15 wherein said reflecting means comprises
means for reflecting a variable portion of said transmitted light.

17. Apparatus as in claim 16 wherein said variable portion reflecting means comprises
a plurality of discrete, partially reflecting bodies and
means for selecting one of said bodies in order to determine said variable portion.

18. Apparatus as in claim 16 comprising
means for providing a continuously variable adjustment of said variable portion.

19. Apparatus as in claim 18 comprising
a partially reflecting body adapted to be spaced from said sheet and
means for adjusting the spacing between said body and said sheet.

20. Apparatus as in claim 19 wherein said spacing adjusting means comprises
a servomechanism responsive to said detector.

21. Apparatus as in claim 14 wherein said response modifying means comprises
a second detector supported on the same side of said sheet as said light source for providing a second response indicative of the intensity of the light from said source which is reflected from the sheet, and means for modifying said transmitted light-indicative response in accordance with said second response.

22. Apparatus as in claim 21 wherein said modifying means comprises
computer means connected to said transmitted light and second detectors for computing an output signal indicative of a contrast ratio opacity.

23. Apparatus as in claim 22 wherein said computer means comprises
means for computing the opacity defined by $R_0/R_g$ where $R_0$ is the reflectance of the sheet with a black backing and $R_g$ is the reflectance of the sheet with a white backing.

24. Apparatus as in claim 21 wherein said light source comprises
an integrating sphere having a light input, a light exit adjacent said sheet, and a further light passage diametrically opposite said light exit, and
wherein said second detector is mounted in said further light passage.

25. Apparatus as in claim 21, further comprising
a black cavity having said transmitted light detector mounted therein,
wherein said second detector is mounted in a position to receive reflected light from a portion of said sheet adjacent to said black cavity.

26. Apparatus for measuring the visual contrast ratio opacity of a moving sheet of paper or the like, which comprises
means for directing a beam of visible light through said sheet from one side thereof,
means on the other side of said sheet for reflecting one substantial portion of the light in said beam which is transmitted through the sheet back toward the sheet whereby it can be rereflected by the sheet,
means for detecting another portion of said light transmitted through said sheet to derive a signal and for detecting said rereflected light to compensate said signal for the reflectivity of said sheet, and means for correlating said compensated signal with the visual contrast ratio opacity of said sheet.

27. Apparatus as in claim 26 wherein said reflecting means comprises
a partially reflecting member between said sheet and said detecting means for reflecting said one substantial portion of the light while transmitting said another portion of said detecting means.

28. Apparatus as in claim 27 wherein said partially reflecting member comprises a translucent window having an effective reflectivity in the range of about 20 to 70 percent.

29. Apparatus as in claim 27 wherein said partially reflecting member comprises
a window of opal glass having a reflective side adjacent to said sheet.

30. Apparatus as in claim 26 comprising
a window on said other side of the sheet for transmitting at least said another portion of said light transmitted by said sheet which is detected by said detecting means, and
means for maintaining said moving sheet substantially in a fixed plane closely spaced from and adjacent to said window.

31. Apparatus as in claim 30 comprising
air pressure means for removing foreign matter from the vicinity of the sheet adjacent to said window, thereby to minimize collection of said foreign matter on the window.

* * * * *